(12) United States Patent
Liu et al.

(10) Patent No.: US 10,317,046 B2
(45) Date of Patent: Jun. 11, 2019

(54) BROADBAND LIGHT SOURCE BASED ON CRYSTALLINE PHOSPHOR

(71) Applicant: Thorlabs, Inc., Newton, NJ (US)

(72) Inventors: Yifan Liu, Shanghai (CN); Yat-Hei Lo, Shanghai (CN); Shengwei Cao, Shanghai (CN)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 16/104,828

(22) Filed: Aug. 17, 2018

(65) Prior Publication Data

US 2019/0056087 A1 Feb. 21, 2019

Related U.S. Application Data

(60) Provisional application No. 62/547,485, filed on Aug. 18, 2017.

(51) Int. Cl.
*F21V 9/35* (2018.01)
*F21V 8/00* (2006.01)
*F21V 3/04* (2018.01)
*F21V 29/70* (2015.01)
*F21V 29/502* (2015.01)
*F21V 5/00* (2018.01)
*F21V 9/20* (2018.01)

(52) U.S. Cl.
CPC ............... *F21V 9/35* (2018.02); *F21V 3/04* (2013.01); *F21V 5/008* (2013.01); *F21V 9/20* (2018.02); *F21V 29/502* (2015.01); *F21V 29/70* (2015.01); *G02B 6/0006* (2013.01)

(58) Field of Classification Search
CPC .............. F21V 9/35; F21V 3/04; F21V 29/70; F21V 5/008; F21V 29/502; G02B 6/0006
See application file for complete search history.

(56) References Cited

U.S. PATENT DOCUMENTS

| | | | |
|---|---|---|---|
| 5,266,803 | A | 11/1993 | Heffelfinger |
| 6,164,790 | A | 12/2000 | Lee |
| 8,709,283 | B2 | 4/2014 | Masuda et al. |
| 8,770,773 | B2 | 7/2014 | Yoshida et al. |
| 2006/0066209 | A1 | 3/2006 | Chau et al. |
| 2010/0025656 | A1 | 2/2010 | Raring et al. |

(Continued)

FOREIGN PATENT DOCUMENTS

| | | |
|---|---|---|
| WO | 2003017653 A2 | 2/2003 |
| WO | 2006102846 A1 | 10/2006 |

(Continued)

OTHER PUBLICATIONS

Michael Cantore, Nathan Pfaff, Robert M. Farrell, James S. Speck, Shuji Nakamura, and Steven P. DenBaars, "High luminous flux from single crystal phosphor-converted laser-based white lighting system," Opt. Express vol. 24, Issue 2, pp. A215-A221 (2016) https://doi.org/10.1364/OE.24.00A215.

(Continued)

*Primary Examiner* — Joseph L Williams
(74) *Attorney, Agent, or Firm* — Myers Wolin, LLC

(57) ABSTRACT

A phosphor based light source, including: an incident beam of light focused onto the front surface of a piece of phosphor; wherein the phosphor has polished back surface coated with a high-reflection, high-thermal-conduction layer, sandwiched between the phosphor and a heat sink, and the phosphor emission light is collected into a fiber or fiber bundle by a single lens or lens groups.

30 Claims, 5 Drawing Sheets

(56) References Cited

U.S. PATENT DOCUMENTS

| | | |
|---|---|---|
| 2010/0253600 A1 | 10/2010 | Fujiwara et al. |
| 2011/0175510 A1 | 7/2011 | Rains, Jr. et al. |
| 2014/0253882 A1 | 9/2014 | King et al. |
| 2018/0003953 A1 | 1/2018 | Fujiwara et al. |

FOREIGN PATENT DOCUMENTS

| | | |
|---|---|---|
| WO | 2012154416 A1 | 11/2012 |
| WO | 2014053953 A1 | 4/2014 |

OTHER PUBLICATIONS

Han-Youl Ryu and Dae-Hwan Kim, "High-brightness Phosphor-conversion White Light Source Using InGaN Blue Laser Diode," J. Opt. Soc. Korea; vol. 14, Issue 4, pp. 415-419 (2010).

Yamada, Kenichi; Imai, Yasuo; Ishii, Kenichi, "Optical Simulation of Light Source Devices Composed of Blue LEDs and YAG Phosphor", Journal of Light & Visual Environment, vol. 27, Issue 2, 2003, p. 70; DOI: 10.2150/jlve.27.70.

Encarnación G. Villora, Stelian Arjoca, Daisuke Inomata, Kazuo Aoki, Kiyoshi Shimamura, "Single-Crystal Phosphors for High-Brightness White LEDs and LDs", The Japanese Association for Crystal Growth (JACG), Journal of the Japanese Association for Crystal Growth, vol. 42 , No. 2 ( 2 0 1 5 ); Special Issue: Recent Advance in Functional Single Crystals.

Osram light source ITOS PHASER (https://www.osram-americas.com/en-us/products/display-optic-specialty-lighting/Pages/ITOS-PHASER.aspx ), Nov. 2015.

"Analysis of high-power packages for phosphor-based white-light-emitting diodes", Appl. Phys. Lett., vol. 86, 243505, 2005.

International Search Report and Written Opinion issued by the International Searching Authority for corresponding International Patent Application No. PCT/us 2018/046999, dated Jan. 31, 2019.

BROADBAND LIGHT SOURCE BASED ON CRYSTALLINE PHOSPHOR

CROSS REFERENCE TO RELATED APPLICATIONS

This application claims the benefit of U.S. Provisional Application No. 62/547,485 filed on Aug. 18, 2017. The contents of U.S. Provisional Application No. 62/547,485 are hereby incorporated by reference.

FIELD OF THE INVENTION

This invention relates generally to broadband light source apparatus, and more particularly to broadband light source based on crystalline phosphor.

BACKGROUND

Optogenetics and scientific imaging applications require high brightness, incoherent light source of certain wavelengths and bandwidth, mainly in visible spectrum. Current solutions like laser pumped plasma light source and white light LED exhibit very high output optical power, but limited brightness due to their relatively large etendue. Supercontinuum lasers have quite high brightness, but most of its output optical power resides in infrared (IR) spectrum, not that useful for the applications aforementioned.

Phosphor based light source provides another possibility to meet this need: Crystalline phosphor material demonstrates suitable emission light wavelength and bandwidth for most applications, and high pumping power sustainability, which means the phosphor converts high brightness incident light of relatively short wavelength into high intensity emission light of longer wavelength.

During the development of broadband phosphor light source, the applicant of the present invention has found that it is difficult to improve the light emission brightness of the phosphor. There are several reasons behind it: (1) Without proper pumping light confinement, the phosphor emission exists in a large volume of the phosphor. So the phosphor emission power concentration is relatively low, even if the total emission power is high. Simply focusing the incident light onto the phosphor doesn't solve the problem, for the phosphor would get overheat and its light conversion efficiency drops down significantly. (2) The emission of phosphor is quasi-isotropic, even if the incident pumping light is in a narrow angle. Only a small portion of the phosphor emission light is collected into the out-coupling fiber if the optical setup is not well-designed. These two problems have to be solved before high output optical power through the output fiber or fiber bundle can be achieved.

The optical design of current phosphor light sources, however, is yet to be optimized. There has been some effort paid to design phosphor based light source.

For example, documents U.S. Pat. No. 8,709,283 B2, U.S. Pat. No. 8,770,773 B2 and US2011/0175510 A1 focus on LED pumped phosphor light source. In these designs the LED emits short wavelength light, such as blue light or UV light. The phosphor is made as a cover layer, a plate or a tube. The LED emission light is absorbed by the phosphor, which emits light of longer wavelength in turn. These designs, however, do not involve optical setups to focus LED emission light into a small domain of the phosphor. Therefore, the light conversion exists in a relatively large volume of space, equaling the size of the phosphor itself. Due to the large emission volume, the phosphor emission brightness is relatively low, which limits its application in optogenetics and scientific imaging.

Disclosed in U.S. Pat. No. 8,709,283 B2 and U.S. Pat. No. 8,770,773 B2 are two typical phosphor light source designs using LED and LED array as the pumping light source. These designs have not introduced any special optical design to improve the phosphor emission brightness, yet. This is because that these product designs are for general illumination applications, and high brightness is not a primary goal for their designs.

M. Cantore et al. has paid attention to the luminous efficacy of laser pumped phosphor light source in their publication "High luminous flux from single crystal phosphor-converted laser-based white lighting system" (Opt. Expr. Vol. 24, No. 2, January 2016). But without special light concentration design, their maximum luminous flux at 14W laser pumping power is 1100 lm, isotropically emitted.

In the documents US2014/0253882 A1 and OSRAM light source ITOS PHASER, there are well-designed light focusing setups to concentrate the incident light onto the phosphor, improving the phosphor emission brightness. However, multiple laser light sources are used in both designs, which make it difficult to confine the laser spot to a minimal size on the phosphor surface. The OSRAM PHASER achieves 2100 lm luminous flux, almost twice higher than M. Cantore's record, but the brightness (luminous flux per unit area of fiber core) is only ~200 $lm/mm^2$, still not high enough for scientific applications.

Further improvement of phosphor emission brightness requires a smaller focusing spot of pumping light source onto the phosphor (such as employing a single high power laser rather than an array of low power lasers). However, for such a high concentration of pumping light power, heat dissipation of phosphor becomes a challenge. Encarnacion Villora et al. has reported the overheat phenomena of phosphor material in the paper "Single-Crystal Phosphors for High-Brightness White LEDS and LDs" (J. of Japanese Assoc. for Crystal growth, Vol. 42, No. 2, 2015). Their analysis concludes that single crystal phosphor sustains higher temperature than conventional ceramic phosphor, but optimized active cooling design is still necessary if high concentration laser pumping is involved.

In another document US2014/0253882 A1, a lens group is employed to focus input pumping laser light onto a small area of the phosphor. However, this setup involves a wheel coated with different kinds of phosphor, so as to acquire different light emission spectrums when different phosphors are pumped in sequence. The price they pay is that the emission spectrum is not constant and stable, but keeps flipping at a pre-set frequency. The emission brightness at a certain wavelength is sacrificed, too, as each single domain of phosphor is pumped for less than ⅓ of total operation time (as the red, green/cyan, yellow and blue sections are pumped one after another). This design principle is necessary for commercial display applications, but it may not be suitable for the scientific applications aforementioned, which does not require full-color imaging, but has a higher requirement on brightness and stability of phosphor emission.

Besides, this phosphor wheel design does not involve any heat sink or other active cooling apparatus, and relies on thermal emission into air and conduction into the wheel base. This limits the maximum pumping laser intensity applied on the phosphor, and the maximum phosphor emission brightness in turn.

Therefore, a new phosphor light source with optimized optical setup is to be proposed to address the issues above.

SUMMARY

This document discloses a broadband light source design based on crystalline phosphor. The optical design is optimized to focus the pumping light onto the phosphor and collects the emission light from the phosphor into the out-coupling fiber efficiently. A heat dissipation design is involved to keeps the phosphor from overheat when the pumping light intensity is high.

In a first embodiment the incident light beam is focused onto the crystalline phosphor surface by a lens or lens group. The phosphor absorbs the incident light and re-emits light of a longer wavelength. The incident angle of the light could be optimized for minimal reflection, such as in Brewster angle. The light collection lens/lens group is placed in another angle, focusing phosphor emission light into a fiber/fiber bundle. There might be an optional filter or filter group placed with the light collection lens (group) for fine-tuning of output light spectrum.

In this first embodiment, the front surface of the phosphor is treated for minimal reflection of incident pumping light and maximum out-coupling of its emission light, such as but not limited to micro-structure design and anti-reflection coating. (An example of existing documents demonstrating micro-structure to fine-tune the light coupling efficiency is U.S. Pat. No. 6,164,790, in which the micro-structure is employed in the back light module of liquid crystal display panel to optimize the light coupling efficiency and distribution.) The back surface of the phosphor is polished and coated by a high-reflection, high-thermal-conduction layer, such as silver coating layer. The backside surface of this layer is in contact with a heat sink or other cooling apparatus. This coating layer transfers heat in the phosphor into the heat sink, so that the phosphor does not overheat, and maintains highest light conversion efficiency, when the incident light power is high. In order to maximize the heat transfer efficiency, the high-reflection, high-thermal-conduction layer may be soldered or welded onto the cooling apparatus, or glued onto the cooling apparatus by thermal conduction paste, or in optical contact with the polished surface of the cooling apparatus.

The second embodiment is also a reflective mode phosphor light source. Similar as in the first embodiment, a beam of incident light, is focused onto the front surface of a crystalline phosphor by a lens or lens group. The phosphor absorbs the incident light and re-emits light with a longer wavelength than that of the incident light. The phosphor emission light is collected again by the same lens/lens group mentioned above. The incident light and phosphor emission light are separated by a short-reflect long-pass filter, such as a dichroic mirror which reflects light with wavelengths shorter than its cut-off wavelength, and transmits light with wavelengths longer than the cut-off wavelength. After passing through the long-pass filter, the phosphor emission light is re-focused into the end of a fiber or fiber bundle by a second lens or lens group. There might be an optional filter or filter group placed with this lens (group) for fine-tuning of output light spectrum.

In this second embodiment, the front surface of the phosphor is treated for minimal reflection of incident pumping light and maximum out-coupling of its emission light, such as but not limited to micro-structure design and anti-reflection coating. The back surface of the phosphor is polished and coated by a high-reflection, high-thermal-conduction layer, such as silver coating layer. The backside surface of this layer is in contact with a heat sink or other cooling apparatus. In order to maximize the heat transfer efficiency, the high-reflection, high-thermal-conduction layer may be soldered or welded onto the cooling apparatus, or glued onto the cooling apparatus by thermal conduction paste, or in optical contact with the polished surface of the cooling apparatus.

In a third embodiment, the designs of the first and second embodiments are combined together. The incident beam of light is focused onto the crystalline phosphor surface in the normal direction by a lens or lens group. The phosphor absorbs the incident light and re-emits light with a longer wavelength than the incident light. The emitted light near normal direction is collimated by the lens/lens group aforementioned. Then it is separated from the incident light by a short-reflect long-pass filter, such as a dichroic mirror, and gets focused into the end of a fiber or fiber bundle by a second light collection lens or lens group. Besides, there are other lenses or lens groups placed around the phosphor, collecting the phosphor emission light that is far away from normal direction. The light collected by these lens/lens groups are focused into yet other fibers or fiber bundles thereafter. All the fiber/fiber bundles are merged together by a fiber combiner, so that all phosphor emission light collected by all lenses output in a single fiber/fiber bundle. There might be optional filters or filter groups placed with each of the light coupling lens (group) for fine-tuning of output light spectrum. For this multiple fiber embodiment, it allows one to use different filters at each output light path, which enables further flexibility on output light spectrum control.

In this third embodiment, the front surface of the phosphor is treated for minimal reflection of incident pumping light and maximum out-coupling of its emission light, such as but not limited to micro-structure design and anti-reflection coating. The back surface of the phosphor is polished and coated by a high-reflection, high-thermal-conduction layer, such as silver coating layer. The backside surface of this layer is in contact with a heat sink or other cooling apparatus. In order to maximize the heat transfer efficiency, the high-reflection, high-thermal-conduction layer may be soldered or welded onto the cooling apparatus, or glued onto the cooling apparatus by thermal conduction paste, or in optical contact with the polished surface of the cooling apparatus.

DETAILED DESCRIPTION OF THE PREFERRED EMBODIMENTS

Figure 1:
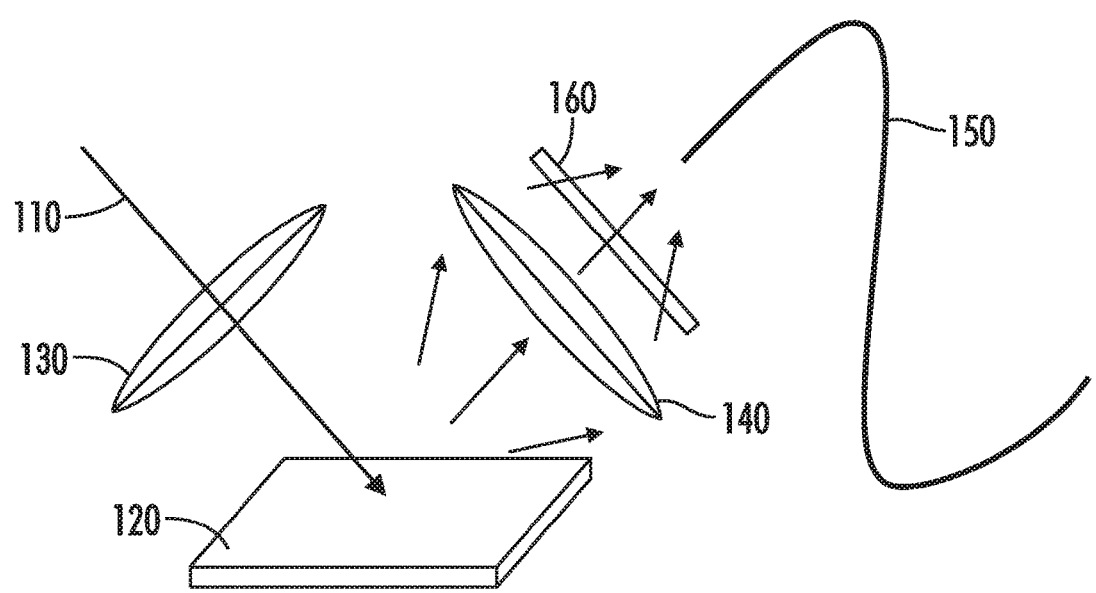
FIG. 1 illustrates a phosphor based light source design according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

In some embodiments of the present patent application, design focus is on the optimization of optical efficiency based on collimated light source. The collimated incident light enables very small focal spot onto the phosphor surface and very high power concentration on this spot. The optical setup design and front surface treatment of the phosphor guarantees minimal surface reflection of incident light and maximum light conversion in the phosphor. Besides, the back surface design of the phosphor is also optimized, both optically and thermally: the coating on the back surface of phosphor is high-reflective to suppress back emission from phosphor, maximizing the out-coupling of light in the front side, and it is also a heat-transfer-layer to dissipate heat from phosphor to the cooling apparatus behind. The light coupling design and cooling design in combination enables high output brightness of the system without risk of overheat in the phosphor.

Based on this design, phosphor light source system design according to an embodiment demonstrates ~3000 lm/mm2 brightness, which is not only one order higher than OSRAM PHASER, but also exceeds other scientific broadband light sources in the market, such as similar phosphor light source of the competitors (SOLA SE II from Lumencor/Newport, <400 lm/mm2), laser pumped plasma light sources (EQ-99XFC from Energetiq, XWS-65 from ISTEQ) and white LED (MCWHF2 from Thorlabs). Therefore, embodiments of the present invention would be competitive and attractive in the market of scientific broadband light source, and are expected to enjoy commercial success as they would fulfill a long-felt need in this market.

FIG. 1 depicts the basic design of a light source described in one embodiment. The collimated incident beam of pumping light 110 propagates towards the surface of a piece of crystalline phosphor 120, and gets focused by lens 130. The phosphor 120 is placed on the back focal point of lens 130, so that the focused pumping light achieves smallest light spot size and highest power density on the surface of the phosphor. The incident angle of the light is optimized to minimize the reflection of pumping light. One example of such incident angle is the Brewster angle incidence.

The phosphor absorbs incident pumping light, then re-emits light of longer wavelength. One lens or lens group 140 is placed in another angle. The phosphor emission light is collected by this lens/lens group 140 and focused into its back focal point. One port of a fiber or fiber bundle 150 is placed on this back focal point, so that the focused light enters the fiber port and output through the other port of the fiber with maximum efficiency. There might be an optional filter or filter group 160 inserted in front of or behind the lens 140, so that the output spectrum of the light source could be fine-tuned by inserting different kind of filters here, or reaches maximum output light by removing the filter.

Figure 2:
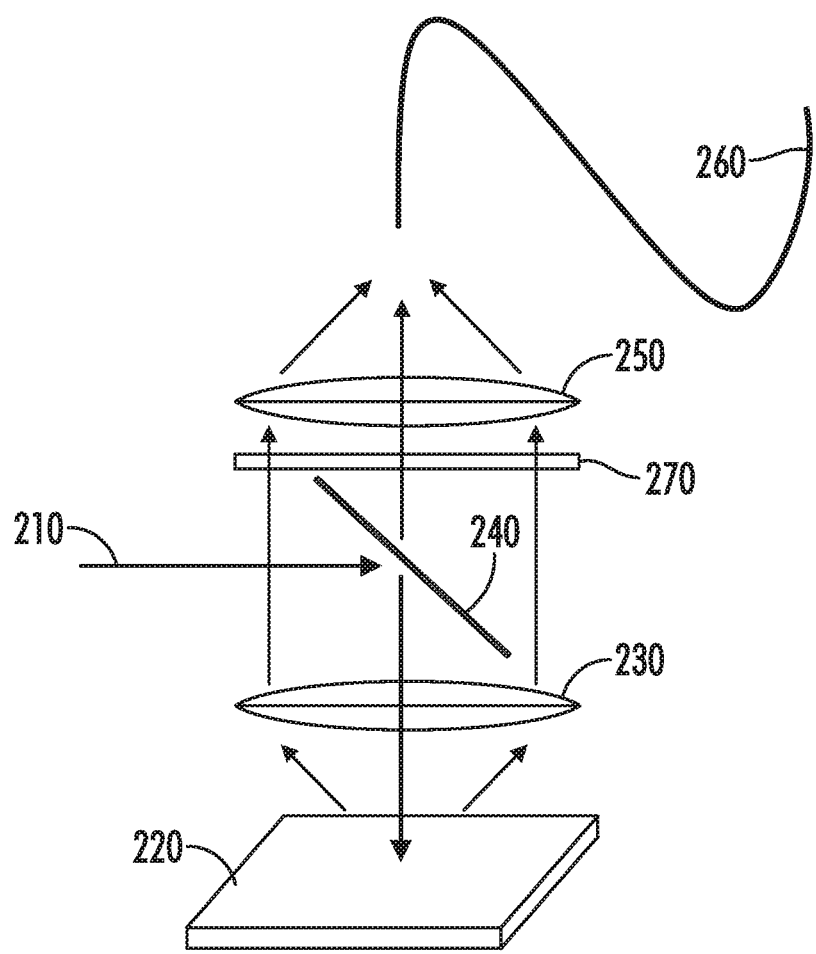
FIG. 2 illustrates a phosphor based light source design according to another embodiment.

FIG. 2 describes a second design of light source in another embodiment. The collimated incident pumping beam of light 210 from the left reaches a long-pass short-reflection filter 240 sandwiched between two lenses 230, 250, such as but not limited to a dichroic mirror. The wavelength of the pumping light is shorter than the cut-off wavelength of the dichroic mirror, so that all incident light is reflected by the dichroic mirror downward, passing through the lens 230 below the dichroic mirror.

A piece of phosphor 220 is placed upon the back focal point of the lens 230 aforementioned. It absorbs pumping light focused by lens 230, and then re-emits light out. The emission light wavelength is longer than the pumping light wavelength, and also longer than the cut-off wavelength of the dichroic mirror. The emission light is collimated by lens 230, then passes through the dichroic mirror with minimal reflection. The transmitted light is re-focused by lens 250 above the dichroic mirror. One port of a fiber or fiber bundle 260 is placed on the back focal point of lens 250, so that the focused light enters the fiber port and output through the other port of the fiber with maximum efficiency. There might be an optional filter or filter group 270 inserted in front of or behind the lens 250, so that the output spectrum of the light source could be fine-tuned by inserting different kind of filters here, or reaches maximum output light by removing the filter.

Figure 3:
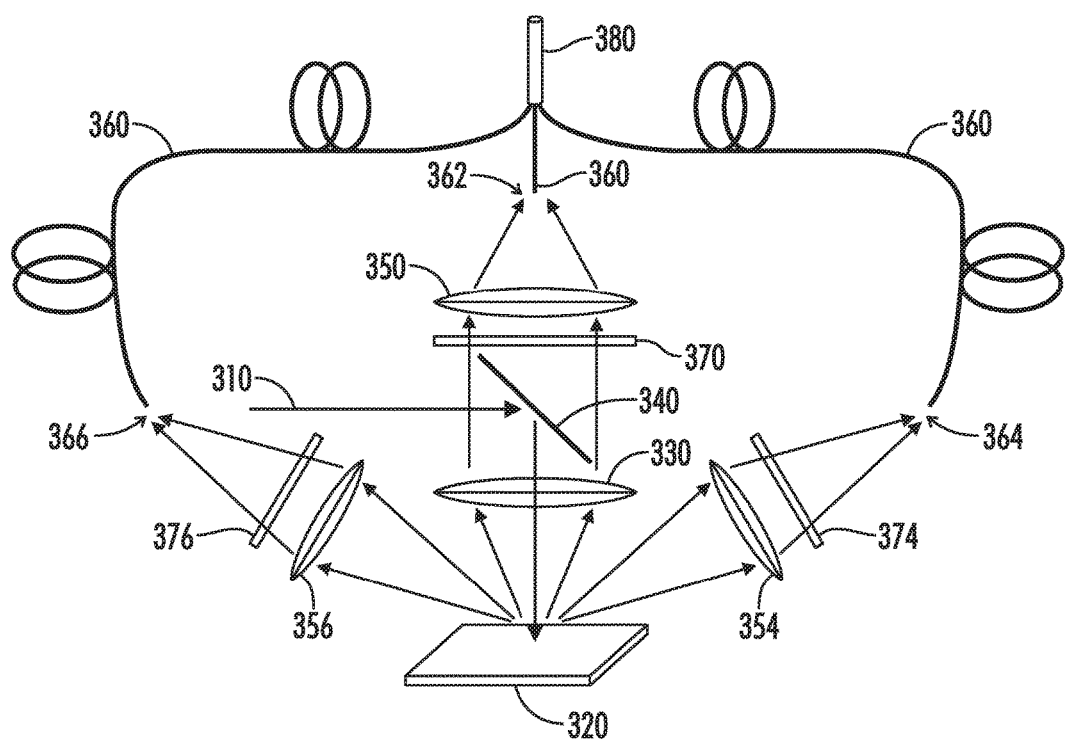
FIG. 3 illustrates a phosphor based light source design according to yet another embodiment.

FIG. 3 describes yet another design of light source in a third embodiment. In this design, the collimated incident pumping beam of light 310 has its wavelength shorter than the cut-off wavelength of the long-pass short-reflect filter 340, such as a dichroic mirror, so that it gets reflected completely by the dichroic mirror. Then the reflected pumping light is focused by the lens 330 onto the surface of a phosphor 320. The phosphor 320 is placed upon the back focal point of lens 330, so the pumping light spot has the smallest possible size on the phosphor.

The phosphor absorbs incident pumping light, then re-emits light with longer wavelength than the cut-off wavelength of the dichroic mirror. Some of the phosphor emission light is collimated by lens 330, transmits through the dichroic mirror completely, and re-focuses into the back focal point 362 of lens 350. One port of a fiber or fiber bundle 360 is placed on this point, so the focused phosphor emission light enters this fiber port with maximum possible efficiency.

There are other lenses or lens groups placed on other directions around the phosphors, such as lens 354, 356. Some of the phosphor emission light is collected by these lenses/lens groups 354, 356 and gets focused into their back focal points 364, 366, respectively. One port of a fiber or fiber bundle 360 is placed on each of these back focal points, and collects the focused phosphor emission light. There might be an optional filter or filter group inserted in front of or behind each of lens 350, 354, 356, so that the output spectrum of the light source could be fine-tuned by inserting different kind of filters here, or reaches maximum output light by removing the filter(s). All fibers or fiber bundles aforementioned are merged together by a fiber combiner, and output all the phosphor emission light they collects through the single output port of the fiber combiner.

Figure 4:
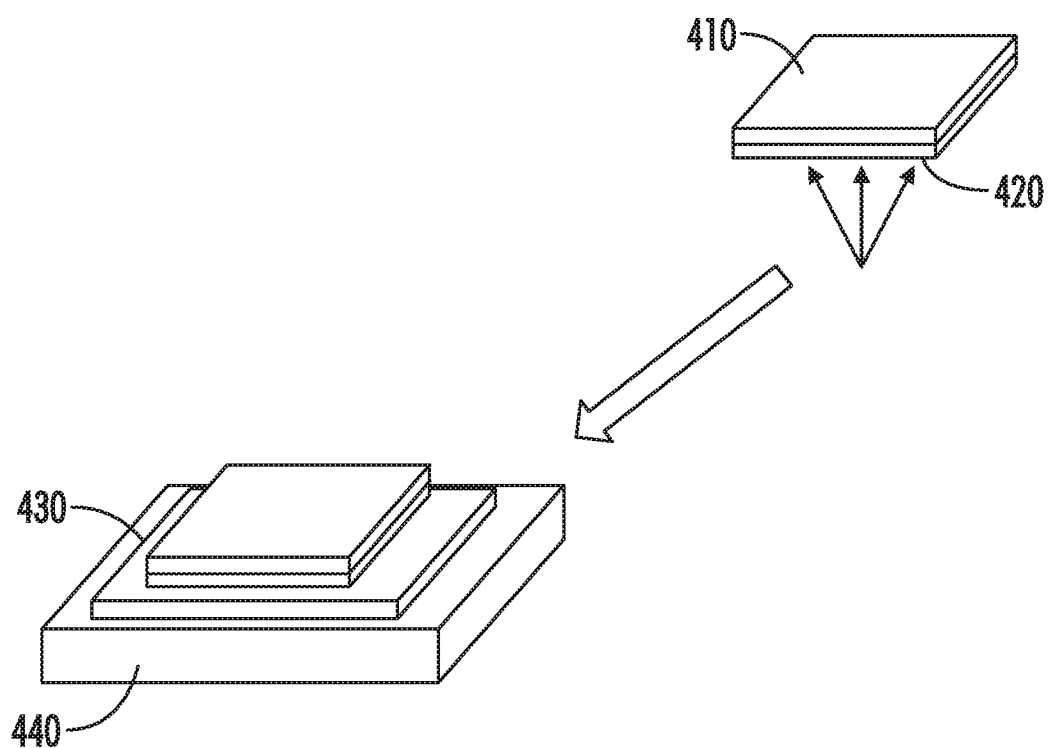
FIG. 4 illustrates the process of manufacturing phosphor coated with high-reflection, high-thermal-conduction layer and in contact with a heat sink or other cooling apparatus.
Figure 5A:
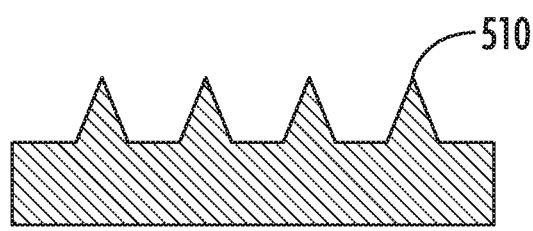
FIGS. 5A-5C illustrate some examples of phosphor surface treatment (cross-section views) to improve light coupling efficiency, such as micro-pikes, micro-spheres and anti-reflection (AR) coating.
Figure 5B:
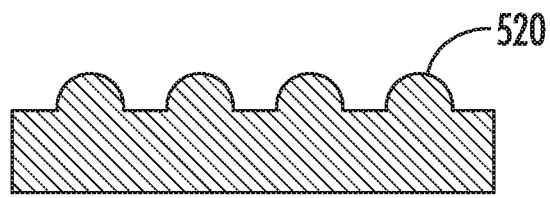
Figure 5C:
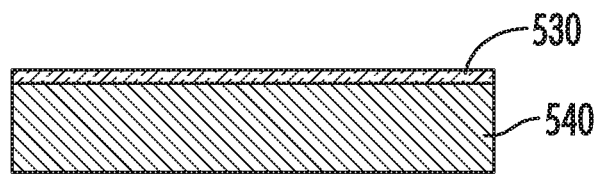

The detailed structure of the phosphor as mentioned in all embodiments above is shown in FIG. 4. The top surface of the phosphor 410 is treated for minimal reflection and maximum out-coupling of light. A high-reflection high-thermal-conduction coating layer 420 is coated on the bottom surface of the phosphor. The coated surface is placed onto a heatsink 440 with thermal conducting paste 430 in between. The thickness of the phosphor is ranged from 0.1 mm to 10 mm. The front surface of the phosphor is designed for minimal reflection of incident light, and maximum out-coupling of emission light, such as but not limited to micro-structures and anti-reflection (AR) coating. FIGS. 5A-5C demonstrate the cross-section views of some examples of the phosphor top surface structure design, such as micro-pikes 510, micro-spheres 520 and/or AR coating 530 on top of the phosphor 540 designed for minimizing incident pumping light reflection. The back surface of the phosphor is polished and coated with a high-reflection higher-thermal-conduction coating, such as silver or aluminum layer. This coating layer contacts a heat sink or other active cooling apparatus including, but not limited to TEC or water cooling plate. In order to maximize the heat transfer efficiency, the high-reflection, high-thermal-conduction layer may be soldered or welded onto the cooling apparatus, or glued onto the cooling apparatus by thermal conduction paste, or in optical contact with the polished surface of the cooling apparatus.

REFERENCES

Ref. [1] U.S. Pat. No. 8,709,283/B2
Ref. [2] U.S. Pat. No. 8,770,773/B2
Ref. [3] US2006/0066209A1
Ref. [4] US2010/0025656A1
Ref. [5] US2011/0175510A1
Ref. [6] US2014/0253882A1
Ref. [7] "Optical simulation of light source devices composed of blue LEDs and YAG phosphors", J. Light & Vis. Env., Vol. 27, No. 2, 70-74, 2003
Ref. [8] "High-brightness phosphor-conversion white light source using InGaN blue laser diode", J. Opt. Soc. Korea, Vol. 14, No. 4, 415-419, 2010
Ref. [9] "Analysis of high-power packages for phosphor-based white-light-emitting diodes", Appl. Phys. Lett., Vol. 86, 243505, 2005
Ref. [10] "Single-crystal phosphors for high-brightness white LEDs and LDs", J. Japanese Asso. Cryst. Growth, Vol. 42, No. 2, 119-129, 2015
Ref. [11] "High luminous flux from single crystal phosphor-converted laser-based white lighting system", Opt. Expr., Vol. 24, No. 2, 251040, 2015

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A phosphor light source, comprising:
   a collimated beam of incident light;
   a piece of crystalline phosphor; and
   a first focusing lens or lens group configured to focus the incident light onto a top surface of the phosphor;
   wherein a maximum thickness from the top surface of the phosphor to the bottom surface of the phosphor is higher than 0.1 mm and smaller than 10 mm, and the top surface of the phosphor is microstructured and coated with a film to reduce the light reflection on the phosphor surface.

2. The phosphor light source of claim 1, further comprising a high-reflection, high-thermal-conduction layer coated on the bottom surface of the phosphor, and a heat sink or cooling apparatus contacting the coated layer.

3. The phosphor light source of claim 2, wherein the collimated incident light is focused by the focusing lens/lens group onto the top surface of the phosphor at a tilted angle.

4. The phosphor light source of claim 3, wherein the focused incident light is absorbed by the phosphor.

5. The phosphor light source of claim 4, wherein the phosphor emits light when it absorbs incident light.

6. The phosphor light source of claim 5, further comprising a second focusing lens or lens group; and
   an optional filter or filter group; which is either inserted to block some of the light passing through, or removed to allow all light passing through.

7. The phosphor light source of claim 6, wherein the phosphor emission light is refocused by the second lens/lens group.

8. The phosphor light source of claim 7, further comprising a fiber or fiber bundle, which transmits the light of wavelengths the same as phosphor emission light, such that the phosphor emission light outputs through this fiber or fiber bundle.

9. The phosphor light source of claim 8, wherein the refocused phosphor emission light is coupled into the fiber or fiber bundle.

10. The phosphor light source of claim 9, wherein the phosphor has its top surface treated with microstructures or optical coating.

11. The phosphor light source of claim 10, wherein the phosphor has its bottom surface coated with a high-reflection, high-thermal conduction layer, in contact with a cooling apparatus.

12. The phosphor light source of claim 2, further comprising a short-reflect long-pass filter, the cut-off wavelength of which is longer than the wavelength of the collimated incident light, such that the collimated incident light is reflected by the dichroic mirror onto the first focusing lens or lens group.

13. The phosphor light source of claim 12, wherein the collimated incident light reflected by the short-reflect long-pass filter is focused by the first focusing lens or lens group onto the top surface of the phosphor.

14. The phosphor light source of claim 13, wherein the focused incident light is absorbed by the phosphor.

15. The phosphor light source of claim 14, wherein the phosphor emits light when it absorbs incident light.

16. The phosphor light source of claim 15, wherein the phosphor emission light has wavelengths longer than the cut-off wavelength of the short-reflect long-pass filter.

17. The phosphor light source of claim 16, wherein the phosphor emission light is collimated by the first focusing lens or lens group, and passes through the short-reflect long-pass filter.

18. The phosphor light source of claim 17, further comprising a second focusing lens or lens group; and
   an optional filter or filter group; which is either inserted to block some of the light passing through, or removed to allow all light passing through.

19. The phosphor light source of claim 18, wherein the collimated phosphor emission light is refocused by the second lens or lens group.

20. The phosphor light source of claim 19, further comprising a fiber or fiber bundle, which transmits the light of wavelengths the same as phosphor emission light, such that the phosphor emission light outputs through the fiber or fiber bundle.

21. The phosphor light source of claim 20, wherein the refocused phosphor emission light is coupled into the fiber or fiber bundle.

22. The phosphor light source of claim 21, wherein the phosphor has its top surface treated with microstructures or optical coating.

23. The phosphor light source of claim 22, wherein the phosphor has its bottom surface coated with a high-reflection, high-thermal conduction layer, in contact with a cooling apparatus.

24. The phosphor light source of claim 21, further comprising multiple focusing lenses or lens groups; and
   multiple optional filters; which are either inserted to block some of the light passing through, or removed to allow all light passing through.

25. The phosphor light source of claim 24, wherein the phosphor emission light is refocused by the multiple lenses or lens groups.

26. The phosphor light source of claim 25, further comprising multiple fibers or fiber bundles, which transmits the light of wavelengths the same as phosphor emission light, such that the phosphor emission light outputs through the multiple fibers or fiber bundles.

27. The phosphor light source of claim 26, wherein the refocused phosphor emission light is coupled into the multiple fibers or fiber bundles.

28. The phosphor light sour of claim 27, further comprising a fiber combiner, such that the focused phosphor emission light output from the multiple fibers or fiber bundles adds up through the fiber combiner and outputs afterward.

29. The phosphor light source of claim 28, wherein the phosphor has its top surface treated with microstructures and/or optical coating.

30. The phosphor light source of claim 29, wherein the phosphor has its bottom surface coated with a high-reflection, high-thermal conduction layer, in contact with a cooling apparatus.

* * * * *